(12) United States Patent
Hariz et al.

(10) Patent No.: US 11,976,991 B2
(45) Date of Patent: May 7, 2024

(54) PRESSURE MONITORING SYSTEM

(71) Applicant: Hexmodal Technologies LLC, Barrington, RI (US)

(72) Inventors: Christopher Hariz, Granada Hills, CA (US); Utkarsh Shah, Barrington, RI (US)

(73) Assignee: Hexmodal Technologies LLC, Brooklyn, NY (US)

( * ) Notice: Subject to any disclaimer, the term of this patent is extended or adjusted under 35 U.S.C. 154(b) by 84 days.

(21) Appl. No.: 17/752,843

(22) Filed: May 24, 2022

(65) Prior Publication Data

US 2022/0373418 A1    Nov. 24, 2022

Related U.S. Application Data

(60) Provisional application No. 63/192,441, filed on May 24, 2021.

(51) Int. Cl.
*G01L 13/06* (2006.01)
*G01L 19/08* (2006.01)
*G01L 27/00* (2006.01)

(52) U.S. Cl.
CPC ............ *G01L 13/06* (2013.01); *G01L 27/007* (2013.01); *G01L 19/086* (2013.01)

(58) Field of Classification Search
CPC ...... G01L 13/06; G01L 27/007; G01L 19/086
See application file for complete search history.

(56) References Cited

U.S. PATENT DOCUMENTS

| | | | |
|---|---|---|---|
| 2015/0084766 A1* | 3/2015 | Cordaro | H04W 4/90 340/521 |
| 2016/0066068 A1* | 3/2016 | Schultz | F24F 11/523 340/870.07 |
| 2020/0143929 A1* | 5/2020 | Pathiratne | G16H 20/30 |

* cited by examiner

*Primary Examiner* — Peter J Macchiarolo
*Assistant Examiner* — John M Royston
(74) *Attorney, Agent, or Firm* — Novak Druce Carroll LLP

(57) ABSTRACT

The subject disclosure relates to power failure simulations, for example to test lighting systems, such as emergency lighting units or lighted signage. In some aspects, a pressure monitoring process of the disclosed technology can include steps for receiving a plurality of differential pressure measurements from the pressure sensor, determining whether to transmit pressure information to a management system based on at least two differential pressure measurements received from the pressure sensor, and transmitting the pressure information to the management system if a difference between the at least two differential pressure measurements exceeds a predetermined threshold. Systems and computer-readable media are also provided.

14 Claims, 5 Drawing Sheets

PRESSURE MONITORING SYSTEM

CROSS-REFERENCE TO RELATED APPLICATIONS

This application claims the benefit of U.S. Application No. 63/192,441, filed May 24, 2021, entitled "AUTOMATED REMOTE PRESSURE MONITORING SYSTEM", which is incorporated by reference in its entirety.

BACKGROUND

1. Technical Field

The subject technology relates to systems and methods for facilitating the management of pressure monitoring systems and in particular, for remotely monitoring pressure differentials between disparate indoor spaces, such as different rooms in an indoor environment.

2. Introduction

In some environments, such as in hospitals, it is important to maintain pressure differentials between rooms, such as between operating rooms and other connected spaces, e.g., hallways. In such applications, air pressure measurements or directional air flows are typically measured manually. However, the manual testing and verification of such pressure differentials can be onerous, especially in larger facilities, such as in hospitals or laboratories often found at large universities.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
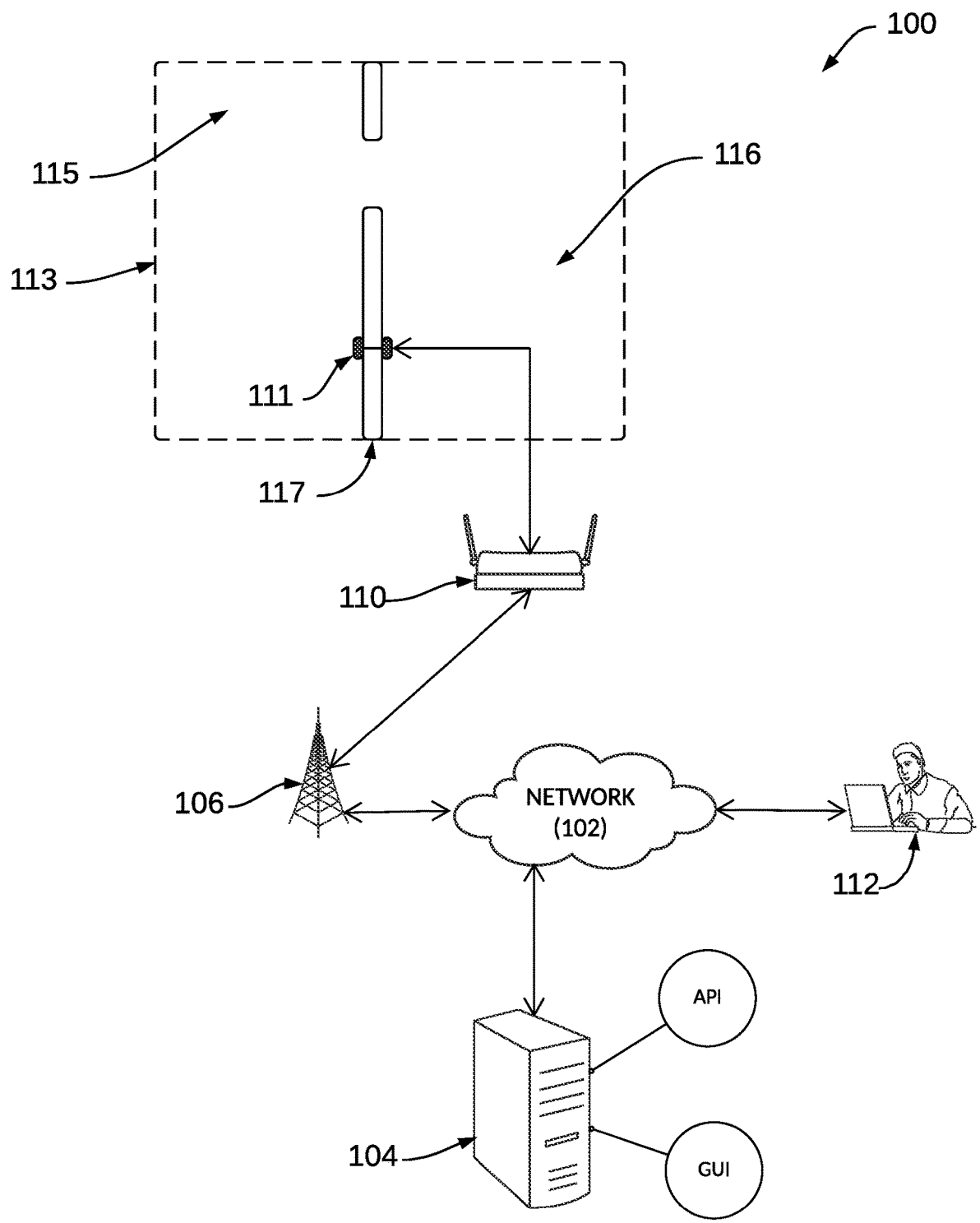
FIG. 1 illustrates an example environment in which an automated pressure sensing system can be implemented, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Aspects of the disclosed technology address the limitations of conventional pressure monitoring approaches by providing systems, methods, processes, and computer-readable media for remotely monitoring atmospheric pressure conditions. The disclosed technology also encompasses software and systems to facilitate the management of multiple separate pressure monitoring devices, e.g., differential pressure sensors. The management system can be configured to communicate with and to manage separate pressure sensors, for example, that are distributed at different locations within a common building or facility, such as a hospital, or that are located at different geographic locations and/or client/tenant sites. As discussed in further detail below, management systems can be configured to facilitate tracking of pressure measurement statistics. As such, the pressure management system can be configured to detecting when required pressure differential levels are not sustained, and for generating alerts to provide notifications to relevant stakeholders or facilities managers.

SUMMARY OF THE INVENTION

In one aspect, the disclosed technology includes a system for facilitating the remote monitoring of pressure differentials between two or more spaces, e.g., indoor areas such as rooms and/or hallways. The system includes a pressure sensor, a wireless transceiver coupled to the pressure sensor, wherein the wireless transceiver is configured for transacting data with a wireless backhaul gateway, and a microcontroller coupled to the wireless transceiver. In some aspects, the microcontroller can be configured to receive a plurality of differential pressure measurements from the pressure sensor and determine whether to transmit pressure information to a management system based on at least two differential pressure measurements received from the pressure sensor.

In another aspect, the disclosed technology provides a computer-implemented method for monitoring atmospheric pressure conditions. The method can include a process for receiving a plurality of differential (atmospheric) pressure measurements from the pressure sensor, and determining whether to transmit pressure information to a management system based on at least two differential pressure measurements received from the pressure sensor.

In yet another aspect, the disclosed technology provides a non-transitory computer-readable storage medium comprising instructions stored therein, which when executed by one or more processors, cause the processors to perform operations to: receive a plurality of differential pressure measurements from the pressure sensor, and determine whether to transmit pressure information to a management system based on at least two differential pressure measurements received from the pressure sensor.

FIG. 1 illustrates an example of an automated pressure sensing system 100 that can be used to monitor and manage one or more various pressure sensors, such as pressure sensor 111. In the example of FIG. 1, a single pressure sensor (e.g., sensor 111) is illustrated; however, it is understood that pressure monitoring can be performed with a multitude of pressure sensors, without departing from the scope of the disclosed technology. In the example environment of FIG. 1, pressure sensor 111 is deployed in an indoor environment of building 113 and configured to sense/measure an atmospheric pressure differential between a first room 115, and a second room 116. In the illustrated example, pressure sensor 111 is affixed to and disposed within a wall 117 separating first room 115 and second room 116. In this example, pressure sensor 111 is configured to measure atmospheric pressure values in each room, and to record the differential pressure value. However, in some aspects, separate/discrete sensors may be used to calculate pressure differentials, for example, by measuring ambient pressure values and comparing the same via a wireless communication means.

Differential pressure values recorded by pressure sensor 111 can be communicated to a management system 104 via a backhaul network that includes a wireless (backhaul) gateway 110, cellular network 106, and public network 102. The various networks, such as network 102, can also facilitate the communications between one or more user devices, such as user device 112, and/or management system 104.

It is understood that various other networks and/or networking devices can be used to facilitate communication between pressure sensor 111, and management system 104, without departing from the scope of the disclosed technology. Additionally, it is understood that any of the networks used to transport data between pressure sensor 111 and management system 104 can include a mix of private and/or public networks. For example, network 102, cellular network 106, and/or wireless gateway 110 can be located in separate networks that are part of (or span) one or more public or private network/s, such as a Local Area Network (LAN), a Wide Area Network (WAN), or a network of networks, e.g., the Internet.

Wireless gateway 110, can be configured to transact data between pressure sensor 111, and cellular network 106. Although it is understood that any wireless protocol can be used to transmit data between gateway 110 and cellular network 106, in some implementation gateway 110 is configured to communicate using an unlicensed radio frequency band, such as WiFi, i.e., any of the IEEE 802.11 standards, Zigbee, i.e., the IEEE 802.15.4 standard, or LoRaWAN, i.e., the IEEE 802.11ah standard, etc. Additionally, wireless gateway 110 can be configured to communicate with one or more other wireless relay devices, such as in a mesh network configuration. Although any mesh network protocol can be implemented without departing from the scope of the subject disclosure, by way of example, gateway 110 may be configured to communicate over a mesh network using any of the standards listed under the IEEE 802.11s standard. It is further understood that various other wireless communication standards can be implemented, without departing from the scope of the disclosed technology.

In practice, pressure sensor 111 can be configured to transmit differential atmospheric pressure measurements to management system 104 at a predefined frequency, such as every minute, every 5 minutes, or 15 minutes, etc. The transmission cadence of pressure sensor 111 may be set as a default parameter or may be adjusted by a user/administrator of management system 104, such as user 112. In some aspects, the transmission frequency of pressure sensor measurements may be based on measures of power availability, such as based on the power level of a connected battery. By way of example, the transmission frequency of pressor sensor measurements may be decreased, e.g., such that measurements are communicated less frequently, if/when it is detected that a charge level of a connected battery is low, e.g., below a predetermined charge threshold. Depending on the desired implementation, the charge threshold at which pressure sensor measurement communications may be decreased can be set as a user configurable parameter.

In some aspects, differential pressure measurements may be transmitted by pressure sensor 111 to management system 104 if/when changes in differential pressure measurements (e.g., between rooms 115, 116) are detected. As such, transmission of pressure sensor information may be triggered when there are apparent increases or decreases in the differential pressure, and/or when the differential pressure falls below (or rises above) a given threshold value.

In some examples, if there are significant changes in temporally proximate measurements, e.g., indicating a rapid change in the pressure differential between rooms 115/116, then the transmission of pressure information from pressure sensor 111 to management system may be triggered. The threshold change required to cause transmission of the pressure sensor information may be set by a predetermined threshold, such as 0.20 Pa. By way of example, if the measured pressure differential at a first time (e.g., $t_1$) is 0.70 Pa, and the measured pressure differential at a second time (e.g., $t_2$) is 0.40 Pa, then transmission of pressure sensor information to management system 104 may be triggered. However, if the measured pressure differential at $t_1$ is 0.70 Pa, and the measured pressure differential at $t_2$ is 0.60 Pa, then transmission of pressure sensor information to management system 104 may not be triggered. Further details regarding the transmission logic of pressure sensor 111 are discussed in relation to FIG. 3, below.

Pressure sensor data received by management system 104 can be aggregated and stored to a secured database that can be referenced using a unique identifier of one or more pressure sensors, an identifier of a group of pressure sensors, and/or an identifier of an owner or stakeholder associated with one or more pressure sensor units. Further details regarding the storage and management of sensor data by management system 104 are provided by U.S. Pat. No. 10,581,267, entitled, "AUTOMATED TESTING OF EMERGENCY LIGHTS," which is hereby incorporated by reference in its entirety.

Figure 2:
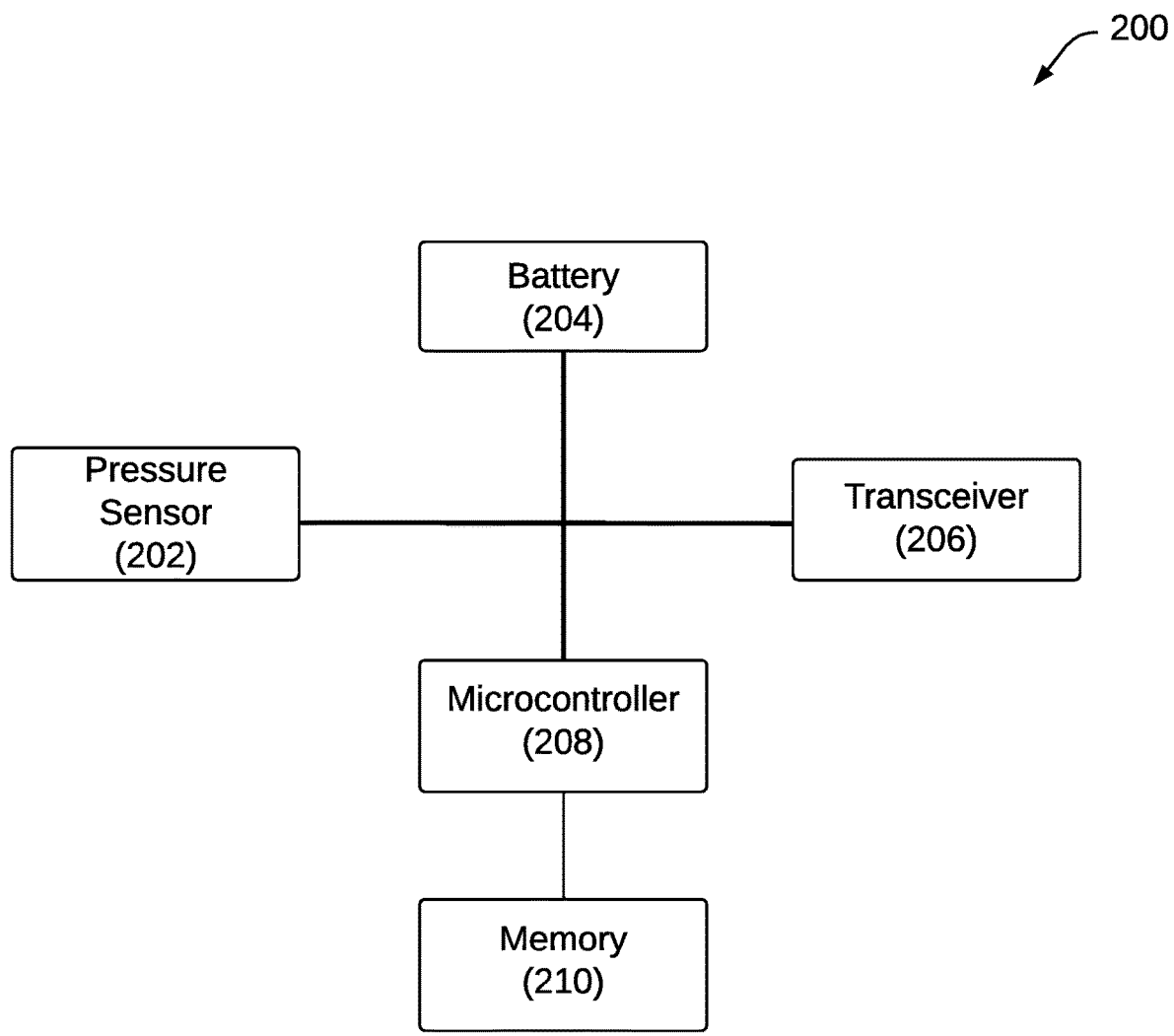
FIG. 2 illustrates a conceptual block diagram of a connected pressure sensor that is configured to communicate with a remote management system, according to some aspects of the disclosed technology.

FIG. 2 illustrates a conceptual block diagram of a connected pressure sensor 200 that is configured to communicate with a remote management system. Pressure sensor 200 includes a differential pressure sensor 202 that is coupled with a battery 204, a transceiver 206, and a microcontroller 208. Additionally, microcontroller 208 is communicatively coupled to a memory 210. Depending on the desired implementation, memory 210 may be a disparate component or may be integrated with microcontroller 208.

In practice, pressure sensor 202 is configured to collect differential atmospheric pressure measurements as discussed above with respect to FIG. 1. The differential pressure measurements can then be provided to microcontroller 208 and stored to memory 210. Additionally, predetermined threshold parameters and/or preset range parameters may be stored to a local memory device, such as memory 210. Transmission of differential pressure information is achieved using transceiver 206, for example, which can be configured for wireless communication with a backhaul gateway (not illustrated), in order to communicate with a remote management system.

As discussed above, determinations of whether pressure sensor information should be transmitted by transceiver 206 can be based on several factors. A more detailed discussion of the transmission logic for connected pressure sensor 200 is provided with respect to FIG. 3, below.

Figure 3:
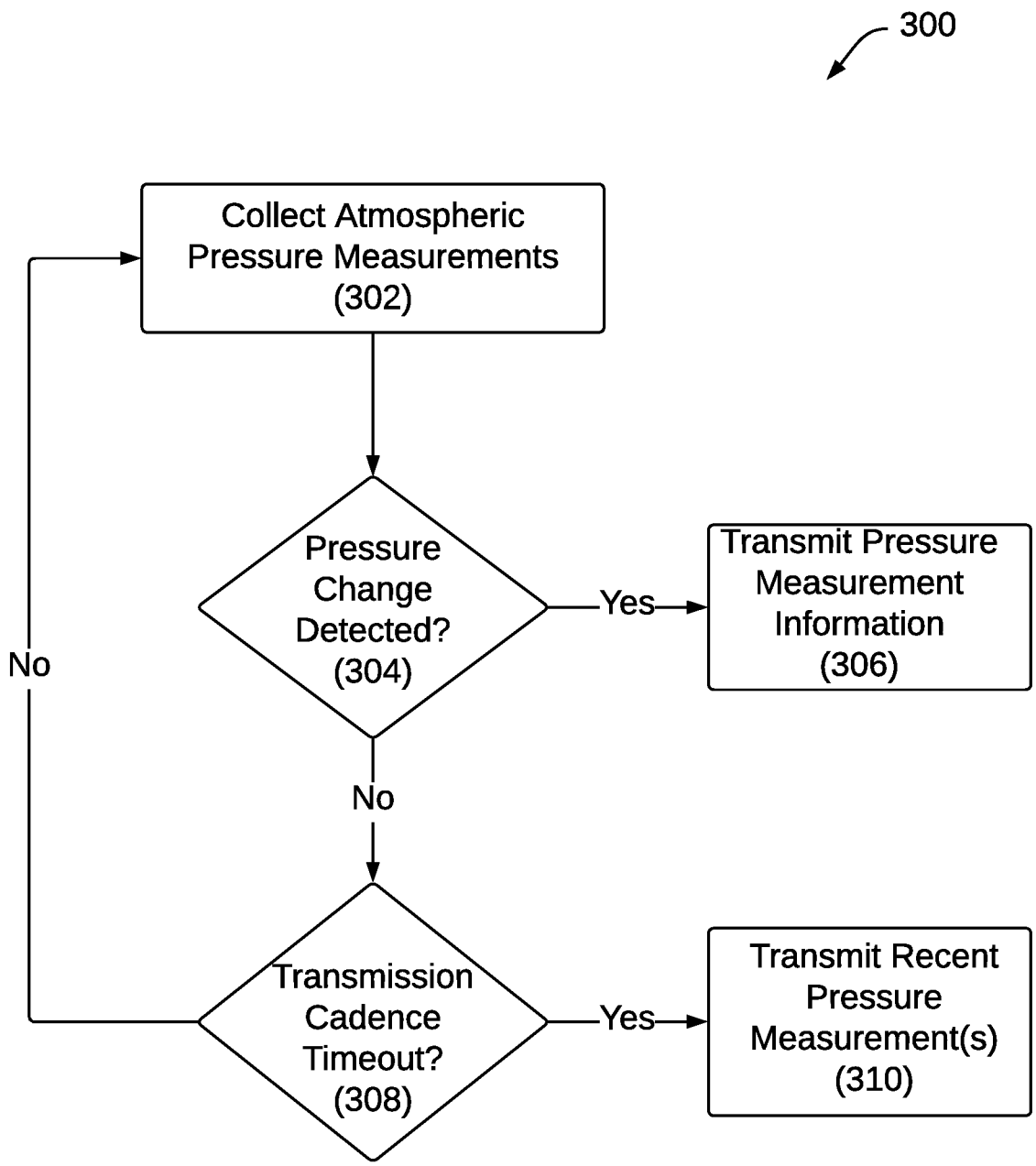
FIG. 3 illustrates an example flowchart of control logic that can be used to determine when pressure information (e.g., differential pressure measurements) is communicated to a remote management system, according to some aspects of the disclosed technology.

FIG. 3 illustrates an example flowchart of control logic 300 that can be used to determine when pressure information is communicated to a remote management system. Initially, at step 302, atmospheric pressure measurements are collected by a pressure sensor, e.g., differential pressure sensor 111, discussed above with respect to FIG. 1.

At step 304, two or more sets of adjacent measurements are compared to determine if any change in differential pressure can be detected. As discussed above, changes above a predetermined threshold, such as 0.20 Pa, can be registered as a significant change. In such instances, the logic can advance to step 306 and the new (or most recent) pressure measurement information can be transmitted, e.g., to a management system, such as management system 104, discussed above. In some aspects, only the most recently measured pressure data may be communicated. In other aspects, all pressure data that has been collected since the last transmission may be communicated as pressure sensor data.

In some aspects, the predetermined threshold change that must occur before data transfer is initiated can be set as a system parameter, or may be user configured. By way of example, a threshold change in differential pressure values needed to trigger transmission of pressure information may be remotely set by a user or administrator of the remote management system (not illustrated). Additionally, the predetermined threshold may depend on other factors, such as the charge level/s of one or more batteries that supply power to the pressure sensor. In such implementations, greater predetermined threshold may be implemented when battery charge levels are low (e.g., to reduce a frequency of transmission), whereas smaller threshold changes may be implemented when battery charge levels are high (e.g., to increase a frequency of transmission). Depending on the desired implementation, the predetermined threshold may be set to an amount that approximately corresponds with the measurement error of pressure sensor, e.g., 0.20 Pa. As such, measured changes below the measurement error threshold may not cause data transmission to occur, thereby preserving battery life of the connected pressure sensor device.

In some implementations, differential pressure readings outside of a preset range may trigger transmission of pressure information, e.g., to the management system. By way of example, if the differential pressure reading is above 5,000 Pa or below 1,000 Pa, then pressure sensor information may be sent to the management system. The upper and lower values of the preset range may depend on a multitude of external factors, including the elevation of the location of the pressure sensor, and/or user configured preferences. As such, the upper/lower threshold values of the preset range may be different in Brooklyn, N.Y. as compared to Bakersfield, Calif.

In instances where no significant pressure changes are detected, and/or the differential pressure readings do not fall outside of the preset range, the logic can advance to step 308, where it is determined if the transmission cadence (or period) has timed out. In some implementations, the connected pressure sensor can be configured to maintain a minimal transmission cadence, for example, to initiate communication with the management system indicating that the device is still functioning/operational. As such, in instances where no significant pressure change has occurred, but the timeout period has been reached, then pressure measurement information can be transmitted (step 310). Alternatively, if the transmission cadence timeout has not been reached, then the logic can revert to step 302 and pressure measurements can continue to be collected by the sensor.

Figure 4:
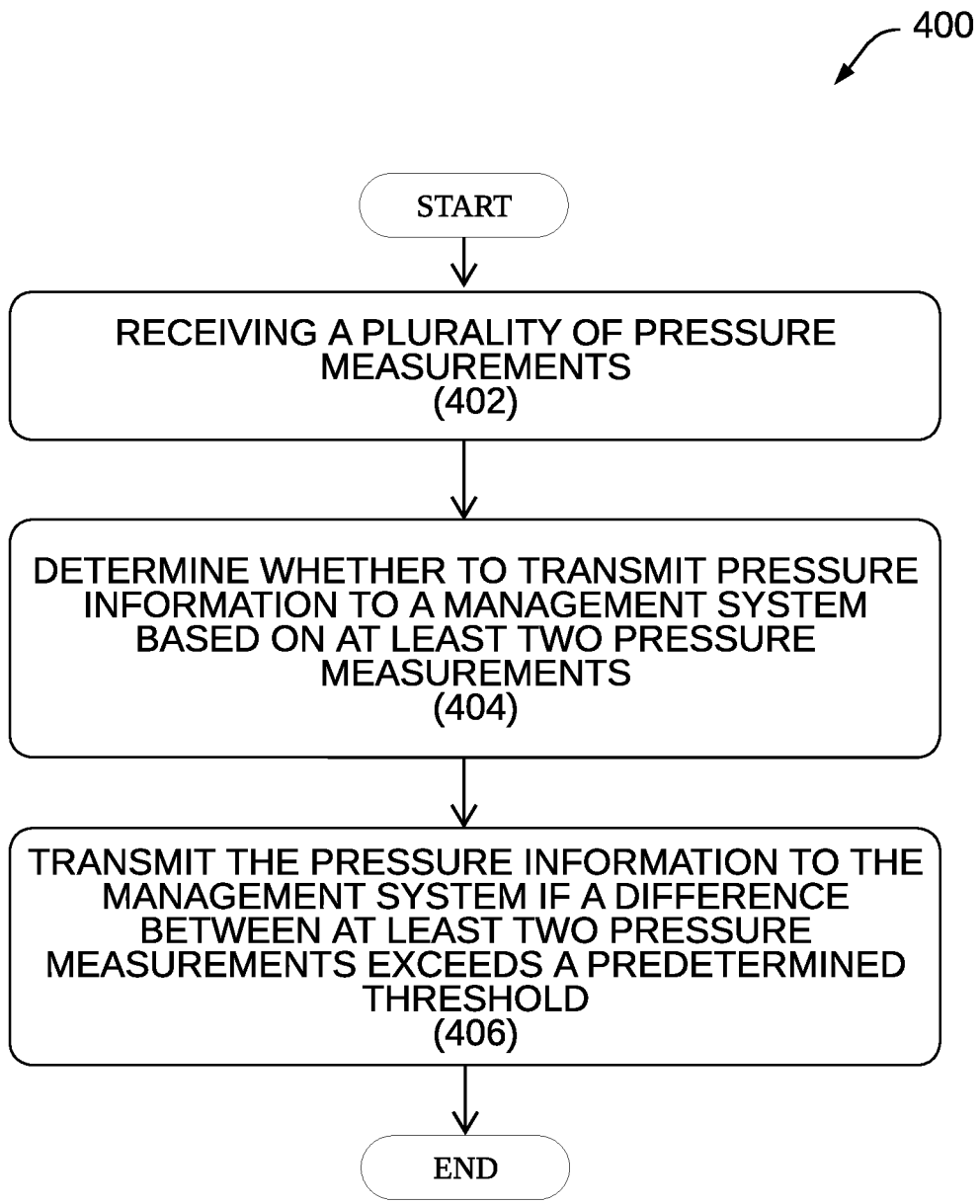
FIG. 4 illustrates a flow diagram of an example process for measuring and communicating pressure information to a remote management system, according to some aspects of the disclosed technology.

FIG. 4 illustrates a flow diagram of an example process 400 for measuring and communicating pressure information to a remote management system, according to some aspects of the disclosed technology.

At step 402, the process 400 includes receiving a plurality of pressure measurements, e.g., from a differential pressure sensor. As discussed above, the pressure measurements can be differential pressure measurements, e.g., that indicate the atmospheric differential between two areas, such as rooms 115, 116 discussed above with respect to FIG. 1.

At step 404, the process 400 includes determining whether to transmit pressure information to a management system based on at least two pressure measurements from among the plurality of collected pressure measurement data points. As discussed above with respect to FIG. 3, changes between measured differential pressure values can trigger the transmission of pressure information to a management system, e.g., if the difference exceeds a predetermined threshold (step 406). Alternatively, pressure information may be communicated if it is determined that any given differential pressure measurement falls above or below a predetermined threshold, i.e., outside of a predetermined (or preset) range. By limiting transmission of pressure measurement data to instances where there are significant changes in measurement values or where differential pressures are outside of an acceptable (or normal/average) range, the system can preserve battery resources, i.e., by limiting data transmission to anomalous data collection events.

In some aspects, other measurement signals may be used to alter the transmission frequency of pressure sensor information. By way of example, a connected pressure sensor of the disclosed technology may be configured to detect a charge level associated with a battery coupled to the pressure monitor, and to reduce a transmit cadence if the charge level is below a predetermined charge threshold.

Figure 5:
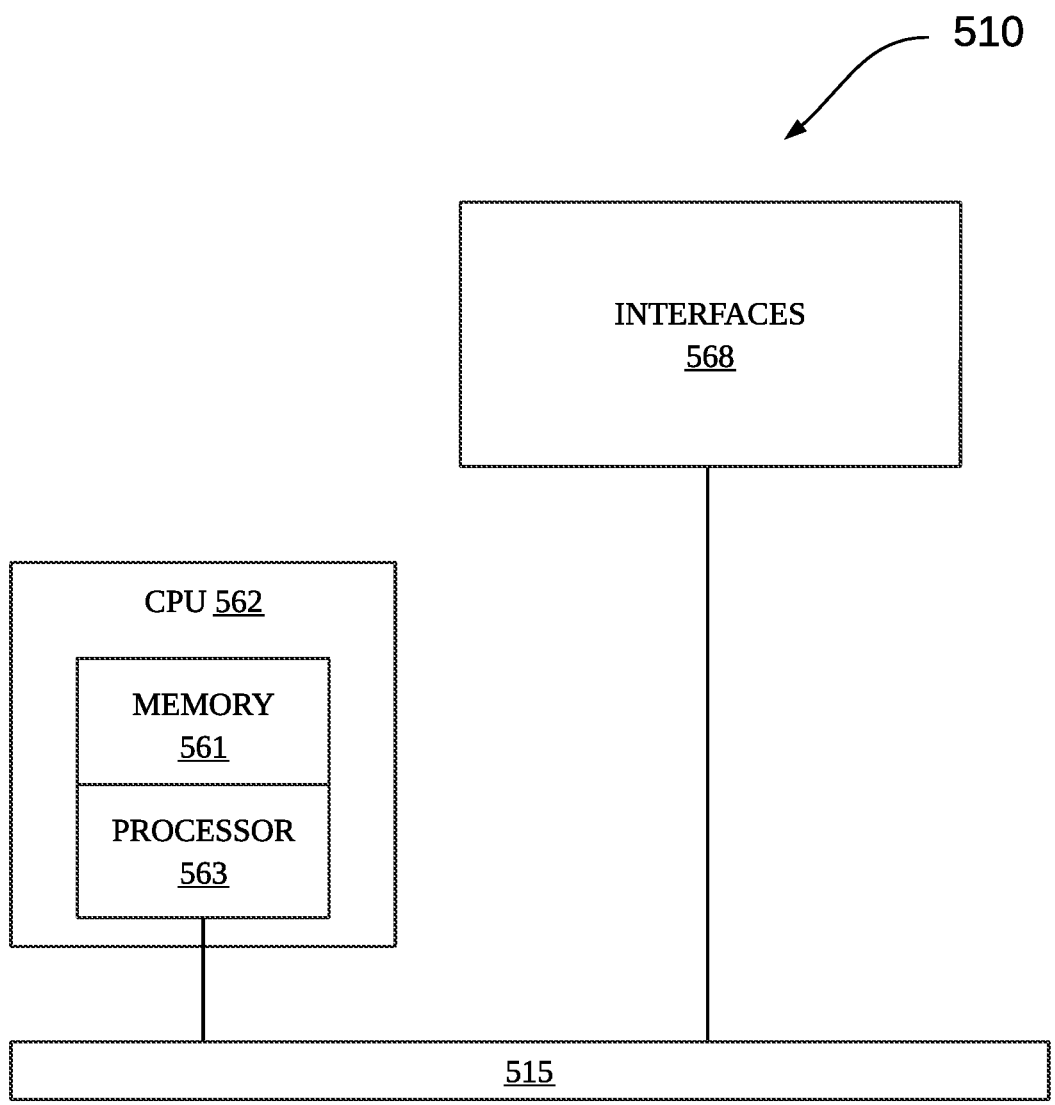
FIG. 5 illustrates an example of a processor-based system with which some aspects of the subject technology can be implemented.

FIG. 5 illustrates an example system in which some aspects of the technology can be implemented. Specifically, FIG. 5 illustrates an example processor-based device 510 that can include, but is not limited to an emergency lighting system, (e.g., used to implement an emergency lighting device), and/or hardware/software configured to implement a management system the disclosed technology.

Processor-based device 510 includes a master central processing unit (CPU) 562, interfaces 568, and a bus 515 (e.g., a PCI bus). When acting under the control of appropriate software or firmware, CPU 562 is responsible for executing operations for receiving a plurality of differential pressure measurements from the pressure sensor, and determine whether to transmit pressure information to a management system based on at least two differential pressure measurements received from the pressure sensor.

Additionally, CPU 562 can be configured to execute operations for: transmitting the pressure information to the management system, if a difference between the at least two differential pressure measurements exceeds a predetermined threshold. CPU 562 can accomplish these functions under the control of software including an operating system and other applications software. CPU 562 can include one or more microcontrollers/microprocessors/processors 563, such as a processor from the Motorola family of microprocessors or the MIPS family of microprocessors.

In an alternative embodiment, processor 563 is specially designed hardware for controlling the operations of processor-based device 510. In a specific embodiment, a memory 561 (such as non-volatile RAM and/or ROM) also forms part of CPU 562. However, there are many different ways in which memory could be coupled to the system.

Interfaces 568 can be provided one or more transceivers and/or interface cards (sometimes referred to as "line cards"). Generally, they control the sending and receiving of data packets over the network and sometimes support other peripherals used with a router. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for intensive communications tasks, these interfaces allow the master microprocessor 562 to efficiently perform routing computations, network diagnostics, security functions, etc.

Although the system shown in FIG. 5 is one example processor-based device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Although the exemplary embodiment described herein employs storage device 460, it should be appreciated by those skilled in the art that other types of computer readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Non-transitory computer-readable storage media expressly exclude media such as energy, carrier signals, electromagnetic waves, and transitory signals per se.

To enable user interaction with processor-based device 510, interfaces 568 can represent any number of input mechanisms, such as a microphone for speech, a touch-sensitive screen for gesture or graphical input, keyboard, mouse, motion input, speech and so forth. Interfaces 568 can also represent one or more output devices or mechanisms known to those of skill in the art. In some instances, multimodal systems enable a user to provide multiple types of input to communicate with processor-based device 510.

For clarity of explanation, various system embodiments are presented as including individual functional blocks including functional blocks labeled as a "processor" (e.g., processor 563) "CPU" (e.g., CPU 562) or "microprocessor/microcontroller" (e.g., microcontroller 218) or processor 563.

The functions these blocks represent may be provided through the use of either shared or dedicated hardware, including, but not limited to, hardware capable of executing software and hardware, such as processor 563, that is purpose-built to operate as an equivalent to software executing on a general-purpose processor.

For example, the functions of one or more processors can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random-access memory (RAM) for storing results. Very large-scale integration (VLSI) hardware embodiments, as well as custom VLSI circuitry in combination with a general-purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 568 can practice all or part of the recited methods, can be a part of the recited systems, and/or can operate according to instructions in the recited non-transitory computer-readable storage media. Such logical operations can be implemented as modules configured to control the CPU 562 or processor 563 can be configured to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it is understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A pressure monitoring system, comprising:
   a pressure sensor;
   a wireless transceiver coupled to the pressure sensor, wherein the wireless transceiver is configured for transacting data with a wireless backhaul gateway; and
   a microcontroller coupled to the wireless transceiver, wherein the microcontroller is configured to:
      receive a plurality of differential pressure measurements from the pressure sensor;
      determine whether to transmit pressure information to a management system based on at least two differential pressure measurements received from the pressure sensor; and
      transmit, using the wireless transceiver, the pressure information to the management system, if a difference between the at least two differential pressure measurements exceeds a predetermined threshold, or if at least one of the plurality of differential pressure measurements is outside a preset range, wherein the predetermined threshold is equal to or less than 0.20 Pa.

2. The pressure monitoring system of claim 1, wherein the predetermined threshold is received from the management system via the wireless backhaul gateway.

3. The pressure monitoring system of claim 1, wherein the predetermined threshold is stored locally on the pressure monitoring system.

4. The pressure monitoring system of claim 1, wherein to determine whether to transmit pressure information to the management system, the microcontroller is further configured to:
   detect a charge level associated with a battery coupled to the pressure sensor; and
   reduce a transmit cadence of pressure information to the management system if the charge level is below a predetermined charge threshold.

5. The pressure monitoring system of claim 1, wherein the microcontroller is further configured to:
   transmit, using the wireless transceiver, the pressure information to the management system, based on a predetermined transmission cadence.

6. A computer-implemented method for monitoring pressure, comprising:
   receiving a plurality of differential pressure measurements from a pressure sensor;
   determining whether to transmit pressure information to a management system based on at least two differential pressure measurements received from the pressure sensor; and
   transmitting the pressure information to the management system if a difference between the at least two differential pressure measurements exceeds a predetermined threshold, or if at least one of the plurality of differential pressure measurements is outside a preset range, wherein the predetermined threshold is equal to or less than 0.20 Pa.

7. The computer-implemented method of claim 6, wherein the predetermined threshold is received from the management system via a wireless backhaul gateway.

8. The computer-implemented method of claim 6, wherein the predetermined threshold is stored locally on a pressure monitoring system.

9. The computer-implemented method of claim 6, wherein determining whether to transmit pressure information to the management system, further comprises:
   detecting a charge level associated with a battery coupled to the pressure sensor; and
   reducing a transmit cadence of pressure information to the management system if the charge level is below a predetermined charge threshold.

10. The computer-implemented method of claim 6, further comprising:
    transmitting, using a wireless transceiver, the pressure information to the management system, based on a predetermined transmission cadence.

11. A non-transitory computer-readable storage medium comprising at least one instruction for causing a computer or processor to:
    receive a plurality of differential pressure measurements from a pressure sensor;
    determine whether to transmit pressure information to a management system based on at least two differential pressure measurements received from the pressure sensor; and
    transmit the pressure information to the management system if a difference between the at least two differential pressure measurements exceeds a predetermined threshold, or if at least one of the plurality of differential pressure measurements is outside a preset range, wherein the predetermined threshold is equal to or less than 0.20 Pa.

12. The non-transitory computer-readable storage medium of claim 11, wherein the predetermined threshold is received from the management system via a wireless backhaul gateway.

13. The non-transitory computer-readable storage medium of claim 11, wherein the predetermined threshold is stored locally on a pressure monitoring system.

14. The non-transitory computer-readable storage medium of claim 11, wherein to determine whether to transmit pressure information to the management system, the at least one instruction is further configured to cause the computer or processor to:
    detect a charge level associated with a battery coupled to the pressure sensor; and
    reduce a transmit cadence of pressure information to the management system if the charge level is below a predetermined charge threshold.

* * * * *